United States Patent [19]

Kew et al.

[11] Patent Number: 5,282,980
[45] Date of Patent: Feb. 1, 1994

[54] METHOD FOR TREATMENT OF WASTE WATER SLUDGE

[75] Inventors: S. Alan Kew, Falmouth Foreside; Robert M. Kritzer, Scarborough; Bruce E. Soule, Yarmouth, all of Me.

[73] Assignee: Kinetic Dispersion Corporation, Scarborough, Me.

[21] Appl. No.: 981,055

[22] Filed: Nov. 24, 1992

Related U.S. Application Data

[63] Continuation-in-part of Ser. No. 837,076, Feb. 18, 1992.

[51] Int. Cl.$^5$ .............................. B01D 21/20
[52] U.S. Cl. .................... 210/787; 210/512.1; 210/628; 210/173; 210/251; 209/169; 241/39; 241/46.17; 366/263; 366/264
[58] Field of Search ............... 210/619, 628, 787, 251, 210/512.1, 173; 209/173, 169; 241/39, 46.17; 366/263, 264

[56] References Cited

U.S. PATENT DOCUMENTS

| | | |
|---|---|---|
| Re. 26,931 | 7/1970 | Valdespino . |
| 668,211 | 2/1901 | Powter . |
| 2,024,986 | 12/1935 | Durdin, Jr. . |
| 2,297,009 | 9/1942 | Mead et al. . |
| 2,479,403 | 8/1949 | Powers . |
| 2,628,081 | 2/1953 | Laird . |
| 2,706,621 | 4/1955 | Laird . |
| 3,271,304 | 9/1966 | Valdespino et al. . |
| 3,311,239 | 3/1967 | Valdespino . |
| 3,497,064 | 2/1970 | Valdespino . |
| 3,620,371 | 11/1971 | Valdespino . |
| 4,347,004 | 8/1982 | Platts . |
| 4,959,183 | 9/1990 | Jameson . |
| 5,045,202 | 9/1991 | Stearns et al. ............... 210/628 |

OTHER PUBLICATIONS

Mark J. Hammer Water and Waste Water Technology 1975, pp. 358, 362, 363, 416 and 425.

Primary Examiner—Robert A. Dawson
Assistant Examiner—David Reifsnyder
Attorney, Agent, or Firm—Ralph W. Selitto, Jr.

[57] ABSTRACT

A method for treating liquid waste water sludge after its generation and separation from the waste liquid involves forcibly impacting sludge particles and microbial cells against a contact surface to thereby fragment the particles into smaller-sized particles and break apart the organic cells. As a result of such a fragmentation process, water located in the pores of the sludge particles is released, thereby enhancing a subsequent dewatering process performed on the sludge. The destruction of the cells permits a subsequent solids digestion process to work more efficiently, while also permitting a more complete conversion to dissolved sugars, proteins and carbon dioxide.

45 Claims, 4 Drawing Sheets

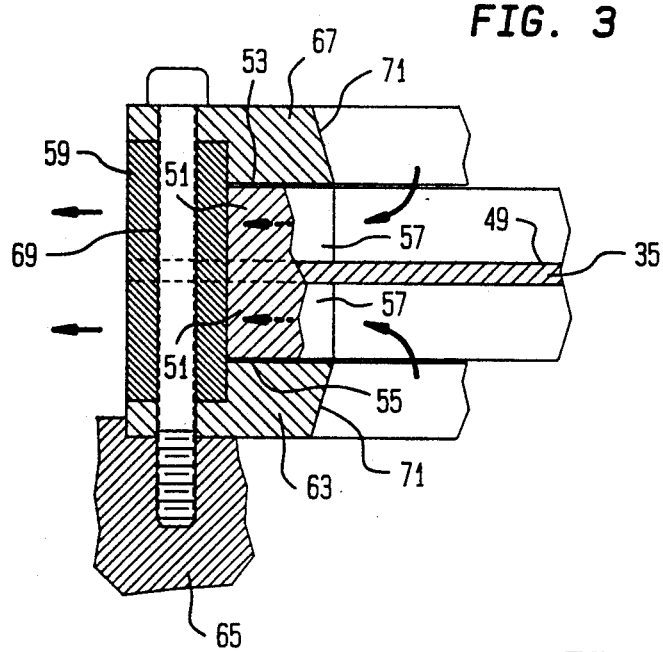
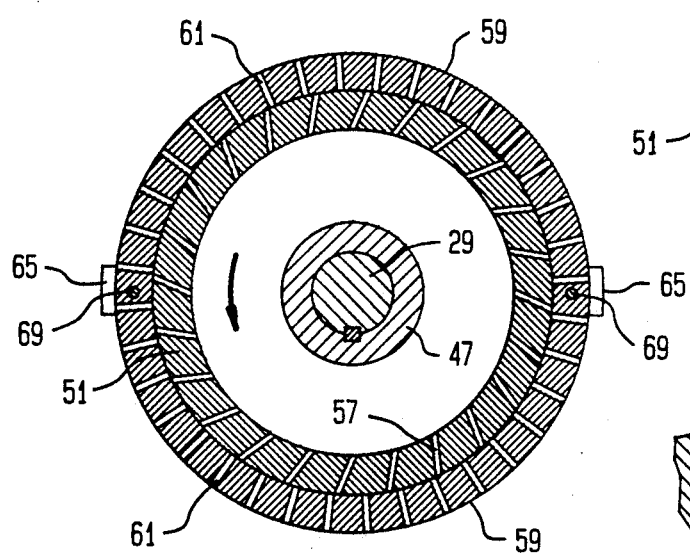
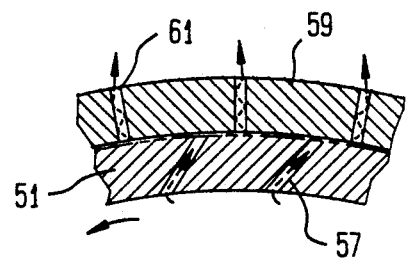
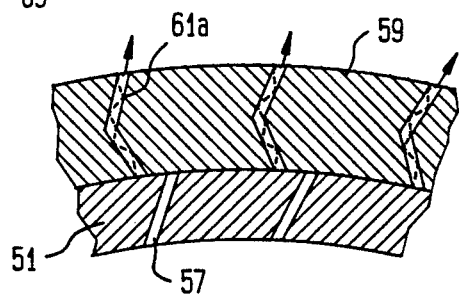
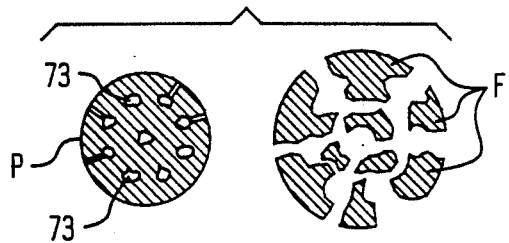

METHOD FOR TREATMENT OF WASTE WATER SLUDGE

CROSS-REFERENCE TO RELATED APPLICATION

This application is a continuation-in-part of U.S. Ser. No. 07/837,076 filed Feb. 18, 1992.

FIELD OF THE INVENTION

The present invention relates to the treatment of liquid waste water sludge after its generation and separation from the waste liquid and, in addition, to the processing of sludge which is wasted or removed from a secondary oxidation process. The invention is applicable to waste water sludges generated by a variety of different waste water treatments, e.g., municipal water systems, paper manufacturing plants, plating facilities, automobile plants, textile plants, and plastics manufacturing plants. The term "waste water" is used herein to generically describe waste liquids (i.e., water or other liquids) containing solid sludge contaminants.

BACKGROUND OF THE INVENTION

Commonly, waste water is treated to remove contaminants that would otherwise prevent reuse of the water in potable water systems or that would contaminate receiving waters. Similarly, other waste liquids are treated to remove contaminants that might prevent reuse of the liquids in industrial processes. Such contaminants can include solid particulate matter, or dissolved acids, metallic salts and organic alcohols, as well as dissolved odorous gases. In the case of solid particulate contaminants, the contaminants are separated out of the liquid as a sludge.

Primary treatment of waste water often involves discharging the waste water into a primary settling tank. The water containing suspended solids is then allowed to remain in the settling tank for a period of time (detention time) sufficient to permit the solid particulates to gravitationally settle to the bottom of the tank as a sludge. This sludge is periodically or continuously removed from the bottom of the tank.

In another type of treatment (i.e., air flotation thickening), air bubbles are injected into the waste water prior to its admission into a subsequent settling tank so that the air bubbles can attach to the solid particulates to provide a lighter particulate condition. In the settling tank, the lighter particulates collect on the liquid surface, where they are skimmed off by an overhead travelling belt-type collector as a thickened sludge. The heavier particulates settle to the bottom of the tank as a second separate sludge.

Sludges can also be produced in a secondary treatment process as a by-product of an aerobic aeration process, wherein an aeration unit is included in aeration basins to bring gaseous air (oxygen) into contact with the particulates. Waste water flows into the aeration basins where it remains for a specified detention time. The air and incoming microorganisms are consumed by microorganisms in the mixed liquor in the aeration basins to produce a microbial floc, i.e., activated sludge. The mixed liquor from the aeration basins then flows to secondary settling tanks. The floc settles to the bottom of the secondary settling tanks, where it is periodically or continuously removed from the effluent liquid phase.

Another process involves anaerobic digestion, wherein the waste water is placed in a closed tank. The closed system allows anaerobic biochemical processes to take place, whereby some of the acids in the waste water are converted to methane gas and carbon dioxide, and solid particulates are thus consumed, or changed, to a liquid and gaseous form. A quantity of sludge remains as a by-product of the process. Typically, the tank is heated to an elevated temperature, at or near 95° F., in order to keep the process ongoing. The methane gas is removed through a vent in the top of the tank, and the sludge is removed through a valved port in the tank wall.

Sludge generated as a result of any of the aforementioned waste water treatments is commonly disposed of by incineration, landfill operations, or ocean deposition. In some cases, the sludge is converted into fertilizer for agricultural use. A common problem associated with economical disposal of the various waste water sludges is the high water content of the sludge removed from the settling tanks. Typically, the sludge will have a water content of from about ninety percent to about ninety five percent, with only five to ten percent of the sludge mass being solids. This fact is an obstacle to the economical disposal of the sludge, since it increases the total sludge quantity that has to be handled. The high water content also makes the sludge somewhat more difficult to handle, because of its larger volume.

In an effort to increase the solids content in the sludge, the raw separated sludge has been subjected to various dewatering treatments, including vacuum filtration, centrifugations, pressure filtration, and drying on sand beds. However, these post-formation dewatering treatments have only been partially successful. The sludges resulting from such dewatering treatments still have only relatively small solids contents Typically, the solids content of so-called dewatered sludge is only about twenty to forty percent, with the remaining eighty percent to sixty percent being water.

The high water content of so-called dewatered sludge is due to the fact that much of the water is contained within the pores of the solid particles, or within narrow channels formed between agglomerated particles. Each particle is a relatively porous cellular structure that acts somewhat like a sponge to absorb and retain water molecules within the particle mass. Conventional dewatering processes are relatively ineffective in drawing, or extracting, water from the pores formed within such solid particles.

SUMMARY OF THE INVENTION

The present invention relates to a method for mechanically shearing and breaking apart solid particles and microbial cells, also referred to herein as particulates, in liquid waste water sludge. By breaking the particulates into smaller-sized fragments, it is possible to break open the pores or cells within the particles, thereby freeing the water that had been absorbed into the pores of the larger-sized particles.

It is theorized that sludge particulates can be subjected to a rapid and violent rupture action that can volatilize or convert (or allow more efficient cell conversion in subsequent aerobic or anaerobic processes) biological cell material in the solid particles into dissolved sugars, proteins and carbon dioxide. The sludge containing ruptured and fragmented solid particles can subsequently be subjected to aerobic and/or anaerobic digestion, prior to a final dewatering treatment.

The resulting reduction in the concentration of total suspended solids and biochemical oxygen demand results in less quantity which must be handled by further processing. Thus, there is less solid material to be dewatered, less to be stored, less to be transported to disposal, and less to be disposed of in landfills, by land spreading, or by incinerating.

The destruction of cell structures and the breaking up of solid particles results in a sludge that is more easily digestible using anaerobic or aerobic digestion systems Because the particle sizes are reduced and cells are broken, thereby making available cell protoplasm or cytoplasm for further synthesis, the digestion processes work to metabolize a greater portion of the sludge than can normally be metabolized.

The destruction of particulate matter and cell structures results in a waste water sludge that is more easily dewatered using conventional dewatering equipment. The bond between water molecules and solid particles and cells is broken by the impingement and mechanical shear, and when conditioned with conditioning chemicals, the sludge releases the water more easily, resulting in a drier sludge than is normally produced by the same dewatering equipment.

The destruction of cell structures and the breaking up of solid particles, prior to recycling the secondary sludge or waste sludge to either the primary clarifiers or to the aeration basins, results in a recycle sludge or waste sludge that is more easily synthesized in subsequent activated sludge processes. The cell materials and particulate matter is in a form that is finer, and exposes more cell protoplasm to synthesis and destruction. This results in greater destruction of organic material in the activated sludge process.

BRIEF DESCRIPTION OF THE DRAWINGS

For a more complete understanding of the present invention, reference may be had to the following detailed description of various exemplary embodiments considered in conjunction with the accompanying drawings, in which:

FIG. 2 is an enlarged sectional view, taken generally along line 2—2 in FIG. 1 and looking in the direction of the arrows, of a rotor/stator assembly which forms a part of the apparatus illustrated in FIG. 2;

FIG. 3 is a fragmentary sectional view of a portion of the rotor/stator assembly illustrated in FIG. 2;

FIG. 4 is a fragmentary sectional view of another portion of the rotor/stator assembly illustrated in FIG. 2;

FIG. 5 is a fragmentary sectional view showing a design which is an alternate to that illustrated in FIG. 4;

FIG. 6 is a diagrammatic view of a sludge particle in its initial state and then after fragmentation in accordance with the present invention;

DESCRIPTION OF THE EXEMPLARY EMBODIMENTS

Figure 1:
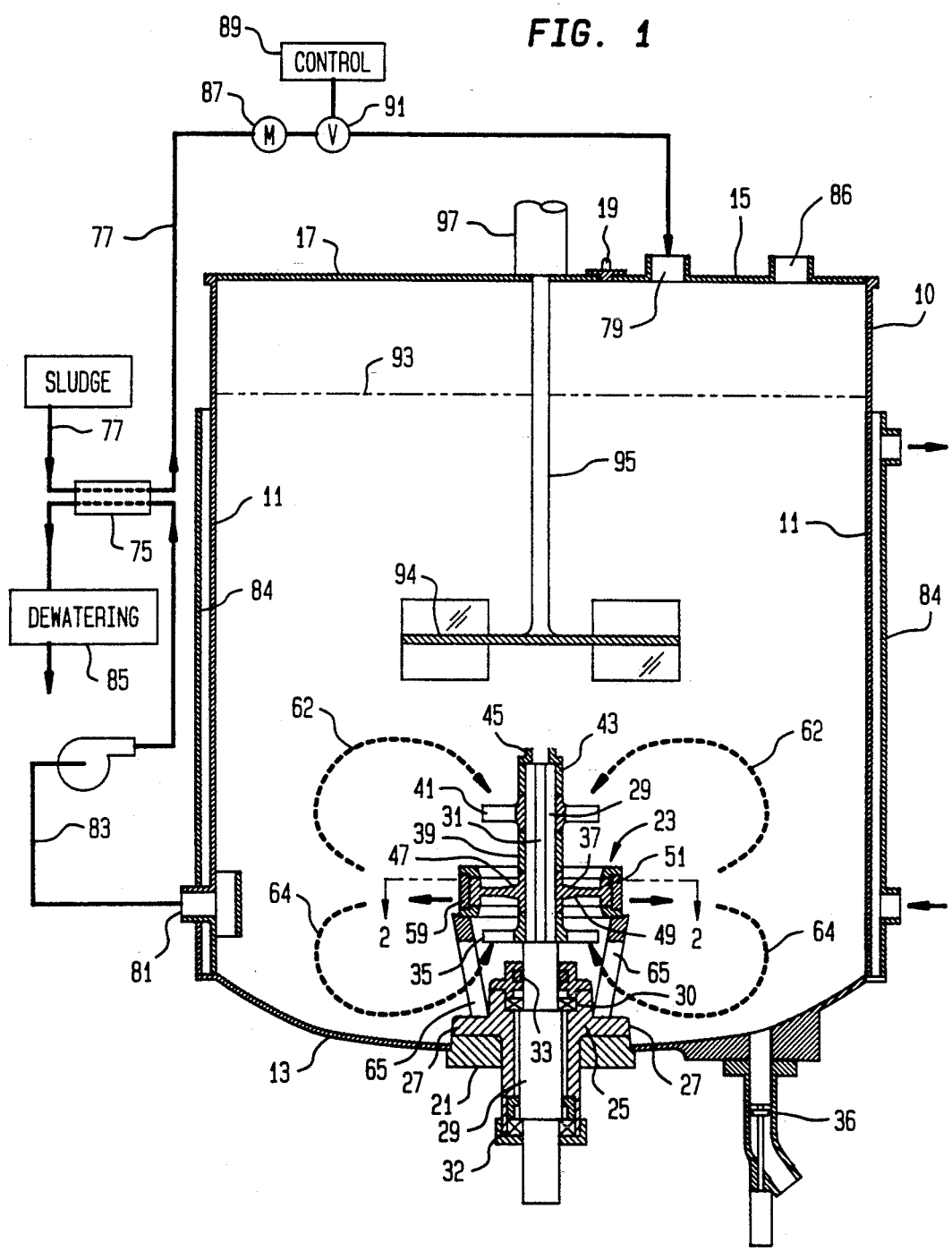
FIG. 1, is a side elevational view, partly in section and partly in schematic, of an apparatus adapted to practice the present invention.

Referring now to FIG. 1, there is shown an upstanding cylindrical sludge tank 10, which includes a cylindrical side wall 11, a bottom wall 13, and a fixed cover 15. The tank 10 may be of other configurations. A top access closure 17 is hingedly connected to the fixed cover 15 by means of a piano hinge 19. The bottom wall 13 includes a circular base plate 21, which functions as a mounting means for a rotor-stator assembly 23.

The rotor-stator assembly 23 includes a generally tubular housing 25, having a flange 27, which is bolted to the base plate 21, whereby the rotor-stator assembly 23 can be manufactured as a unit for subsequent installation within the tank 10. A vertically oriented shaft 29 extends through the housing 25 in such a manner that the lower end portion of the shaft 29 is exposed for connection to a drive motor, or a drive pulley, of a belt-driven system (not shown).

In practice, a rotor 37 of the rotor-stator assembly 23 would be driven at a speed ranging preferably from about five thousand to about eleven thousand feet per minute. Rotor speeds above eleven thousand feet per minute are generally considered impractical, because of flow cavitation effects and power efficiency considerations relating to the operation of the rotor 37, which is driven by the shaft 29.

The shaft 29 is rotatably supported by an upper bearing 30 and a lower bearing 32. A seal 33 is provided to prevent leakage along the surface of the shaft 29. The shaft 29 has an axial keyway 31 extending therealong so that a stack of annular components can be removably affixed to the shaft 29. These components include a lower axial flow propeller 35 or spacer, a sludge-discharging rotor 37, a spacer 39, an upper axial flow propeller 41 or spacer, and another spacer 43. The upper end of the shaft 29 is threaded to receive a nut 45, whereby the stacked components are removably affixed to the shaft 29. If the propellers 35 and 41 are used, their bladings would be configured such that the upper propeller 41 produces a downwardly flowing sludge stream into the rotor 37, whereas the lower propeller 35 produces an upwardly flowing sludge stream into the rotor 37.

The rotor 37 includes an annular hub 47, which is affixed to the shaft 29, an imperforate web wall 49, which extends radially outwardly from the hub 47 in a plane normal to the axis of rotation of the rotor 37, and an axially thickened peripheral rim wall 51 located at the outer edge of the web wall 49. As best seen in FIG. 3, the rim wall 51 extends axially in opposite directions from the web wall 49 such that flat end edges 53 and 55 of the rim wall 51 are equidistant from the plane of the web wall 49.

The rim wall 51 has a number of slots 57 extending therethrough at evenly spaced points around the periphery of the rim wall 51. Each of the slots 57 extends completely through the rim wall 51 from its inner side edge to its outer side edge, whereby each slot 57 acts as a sludge particle passageway. There are two sets of slots 57, namely an upper set located above the plane of the web wall 49 and a lower set located below the plane of the web wall 49. Each slot 57 of the lower set extends downwardly from the plane of the web wall 49 to the end edge 55 of the rim wall 51. Each slot 57 of the upper set extends upwardly from the plane of the web wall 49 to the end edge 53 of the rim wall 51.

With particular reference to FIG. 2, the rotor 37 is rotatably positioned within an annular cylindrical stator 59, which has two sets of slots 61 evenly spaced therearound. As seen in FIGS. 2 and 3, the inner cylindrical side surface of the stator 59 is in close physical proximity to the outer cylindrical side surface of the rotor 37, whereby sludge particles discharged from the rotor slots 57 are immediately directed into the stator slots 61. The stator slots 61 are intermittently aligned with the rotor slots 57 as the rotor 37 rotates on its central axis. Sludge thereby passes from the rotor slots 57 into the stator slots 61 for discharge to the annular space surrounding the stator 59. There are two separate discharge streams, namely an upper stream through the upper set of the stator slots 61 and a lower stream through the lower set of the stator slots 61.

Referring again to Figure the general sludge flow pattern generated within the tank 10 is shown. As can be seen, there is an upper toroidal flow path 62 generated by the upper set of the rotor slots 57 and a lower toroidal flow path 64 generated by the lower set of the rotor slots 57. If used, the propellers 35 and 41 reinforce and maintain the respective flow paths, whereby the sludge is continuously recirculated from the annular zone surrounding the stator 59 back into the rotor 37. The toroidal flow paths induce sludge bordering the respective paths to be drawn into the rotor 37, whereby essentially all of the sludge in the tank 10 is passed through the rotor-stator assembly 23 over a period of time. However, it is envisioned that an embodiment may be constructed without the propellers 35 and 41.

The stator 59 may be supported in a variety of different ways. As shown in FIG. 3, the stator 59 is seated on a lower annular shroud wall 63, which extends radially inwardly along the lower edge of the rim wall 51 of the rotor 37. The shroud wall 63 is attached, or seated, on two arms 65 extending upwardly from the housing 25. An upper annular shroud wall 67 overlies the stator 59 and the upper edge of the rim wall 51 of the rotor 37. Bolts 69 extend through the shroud walls 63 and 67 and the annular stator 59, whereby the stator 59 is supported in a fixed position above the bottom wall 13 of the tank 10.

The shroud walls 63 and 67 are affixed to the stator 59, with slight clearances from the rotor 37, such that inner edges 71 of the shroud walls 63 and 67 guide the incoming sludge into the annular space between the hub 47 and the rim wall 51 of the rotor 37. Within the rotor 37, the sludge turns radially outwardly for passage through the slots 57. If the propellers 35 and 41 are used, they provide part of the impetus for the sludge flow. However, the surfaces of the slots 57 of the rotor 37 also function as impeller surfaces, whereby the sludge is centrifugally thrown outwardly through the slots 57 and into the slots 61 of the stator 59.

Referring to FIG. 4, the sludge flow through the slots 57 and 61 of the rotor 37 and the stator 59, respectively, is shown. As can be seen, the sludge has both a radial flow component and a circumferential flow component as it passes through the slots 57 of the rotor 37. As the sludge leaves the slots 57, the circumferential flow component causes the sludge particles to strike the walls of the slots 61 of the stator 59 at an angle, thereby subjecting the particles to an impact force. The sludge particles rebound angularly to strike opposite walls of the slots 61 at an oblique angle. Depending on the radial thickness of the stator 59, the particle may rebound repeatedly against the walls of the slots 61. With each such impact, the sludge particles are subjected to a destructive fragmentation force. The sludge particles are also subjected to some shearing forces as they traverse the annular space between the rotor 37 and the stator 59 in the course of their travel from the slots 57 of the rotor 37 into the slots 61 of the stator 59. The predominating fragmentation force is, however, believed to be the impact force generated in the slots 61 of the stator 59.

The slots 57 and 61 are preferably the same width, whereby a sludge stream discharged from one of the slots 57 is at least partially captured by the next one of the slots 61 encountered by the sludge stream. The preferred slot width ranges from about 3/32 of an inch to about ⅜ of an inch. The radial thickness of the stator 59 wall is preferably at least one inch, which is sufficient to produce multiple impacts of the sludge particles against the walls of the slots 61. The wall thickness of the stator 59 could, however, be increased if desired.

As shown in FIG. 4, the slots 61 of the stator 59 are radially oriented. However, the slots 61 could have non-radial orientations, as shown, for example, in FIG. 5, or similar to that of the slots 57.

Referring to FIG. 5, slots 61a are provided with an entrance end, having one orientation, and an exit end, having a different orientation. While the exact slot orientation is not critical, if the slots 61 and 61a of the stator 59 are angled relative to the slots 57 of the rotor 37 as shown in FIGS. 4 and 5, there may be a slightly greater impact force due to the angle of attack on the walls of the slots 61 and 61a.

Preferably, both sets of the slots 57 and 61 are evenly spaced apart as shown in FIG. 2. However, the spacing and/or width of the slots 57 of the rotor 37 could be different than the spacing and/or width of the slots 61 of the stator 59. The slot spacing is selected to achieve a relatively high linear speed of the sludge particles in the slots 61, with minimal surging, flow variation, or dead spots in the flow pattern.

With reference to FIG. 6, a sludge particle P is typically a porous cellular mass, having a multiplicity of internal pores or voids 73, which may or may not be connected, as shown at the left in FIG. 6. The sludge mass is saturated with water such that the pores 73 are water-filled. The fragmentation forces can be expected to produce some separation in the sludge particle P along failure lines generated from the various internal pores 73. When the particle P is broken into fragments F, as shown at the right in FIG. 6, the cells are exposed or opened, such that water is freed from the interior of the cells. The freed water has a reduced attachment to the sludge fragments F, so that the freed water is later easily separated from the sludge fragments F in a dewatering apparatus (not shown). The fragmentation process therefore frees entrapped water from the particle P by rupturing the internal cells that act as water storage chambers, while promoting the conversion of sludge cells to dissolved sugars, proteins and carbon dioxide. In addition, the fragmentation process opens up the interior of the cells and exposes the protoplasm or cytoplasm, which can then be digested by enzymes in this process and/or in other subsequent processes.

The apparatus of FIG. 1 may be constructed in various sizes and capacities. However, in an exemplary embodiment, the tank 10 has a diameter of about sixty inches and the stator 59 has a diameter of about fifteen inches. The ratio of the inside diameter of the tank 10 to the diameter of the stator 59 is preferably in a range of from about two to about twelve to one, thus providing a substantial annular clearance between the stator 59 and the side wall 11 of the tank 10 for recirculation of sludge along the toroidal paths 62 and 64. Alternate embodiments include: utilizing multiple rotor/stator assemblies; and mounting the rotor/stator assembly or assemblies horizontally or from above, rather than from below.

Referring still to FIG. 1, a system for circulating sludge through the tank 10 includes a heat exchanger 75, which receives sludge from a settling tank, aeration tank, or other coagulation mechanism through line 77. The sludge is introduced to the tank 10 through an inlet 79, which is located in the fixed cover 15. Sludge processed in the tank 10 is discharged through an outlet 81 near the bottom wall 13 of the tank 10. The treated sludge flows through a line 83, which passes through the heat exchanger 75. Accordingly, the outgoing sludge flowing through the line 83 may exchange heat with the incoming sludge flowing through the line 77. Because the outgoing sludge is usually at a higher temperature than the incoming sludge, the sludge in the line 83 will function as a preheater for the incoming sludge in the line 77.

The line 83 transports the treated sludge to a dewatering unit 85, where a substantial percentage of the now-freed water is separated from the sludge particulates. The dewatering operation is enhanced, i.e., becomes more effective, because the bound water in the microbial cells in the sludge is, to a great extent, freed from the fragmented sludge cells. The dewatering apparatus is therefore not required to extract the water from within the sludge cells. Further, because some of the sludge cells are converted to sugars, proteins and carbon dioxide, there is now a smaller quantity of solids in the sludge to be disposed of.

Various types of conventional dewatering apparatus can be used. For example, the dewatering apparatus can include a sand bed having a gravel bottom for drainage. The sludge is deposited on the sand bed for air drying of the particulates, with water draining through the sand bed.

Another type of dewatering apparatus involves passage of the sludge through a porous medium under a vacuum operating force. The medium can be located on a rotary drum that has a sludge inlet connected to the drum interior. The vacuum draws water outwardly through the filtering medium, leaving a filter cake of sludge on the interior surface of the drum.

Pressure filtration can also be used to remove water from the sludge. Filter cloths are supported on frames arranged in a parallel array. Sludge under pressure enters spaces between the frames in such a manner that clear filtrate passes through the various cloth panels, the dewatered sludge collecting as a filter cake on the cloth panels.

Centrifugal separation techniques can also be used for dewatering sludge. The sludge is fed into a rotating bowl, where the sludge collects on the interior surface of the bowl, water exiting through an opening in the end wall of the bowl. Finally, a helical blade scrapes the filter cake from the bowl surface.

Another method of sludge dewatering involves the passage of sludge into a belt filter press. Two opposed traveling belts gradually come together along a sludge treatment zone. Sludge is squeezed and carried along the opposed belt surfaces. Water drains out of the squeezed sludge for drainage through the lowermost belt.

The apparatus shown in FIG. 1 can be readily used in conjunction with any of the above-described dewatering mechanisms. In each case, the dewatering mechanism will have an increased effectiveness, due to the fragmentation process carried out by the apparatus of FIG. 1. The result is effected by the nature of the incoming sludge, as well as by the sludge detention time in the tank 10. The longer the detention time, the greater the increase in solids destruction achieved. In one case, in which the detention time in the tank 10 was thirty minutes, the solids concentration in the dewatered sludge was increased by about seventy percent. The term "detention time" is somewhat arbitrarily arrived at by dividing the tank slurry volume by the sludge feed rate through the tank 10. For example, if the tank 10 has a slurry volume of 750 gallons and the sludge feed rate is 25 gallons per minute, then the detention time is calculated as thirty minutes. Optimum detention time for each sludge must be determined before selecting tank size.

Sludge flow through the tank 10 can be controlled in various ways. As shown in FIG. 1, a flow meter 87 is arranged in the line 77 in order to measure the flow rate. An electronic or pneumatic signal is fed to a motorized or pneumatic operator in a controller 89 for flow control valve 91, whereby the flow through the line 77 is regulated or controlled. The sludge flow can also be regulated as a function of the liquid level in the tank 10 or the rate of flow through the meter 87. In normal operation, the liquid level would be relatively close to the cover 15, e.g., at the level designated by numeral 93 in FIG. 1. The tank 10 can be periodically drained by means of a sludge drain valve 36.

In order to achieve a relatively undisturbed toroidal flow path 62, as shown in FIG. 1, a flat baffle plate 94 can be provided directly above the upper propeller 41. The baffle plate 94 is preferably adjustable vertically to obtain the best sludge guidance position. The baffle 94 is carried on a rod 95, which extends from an air cylinder 97 mounted on the access closure 17. The baffle 94 can be raised or lowered in response to the operation of the cylinder 97.

Figure 7:
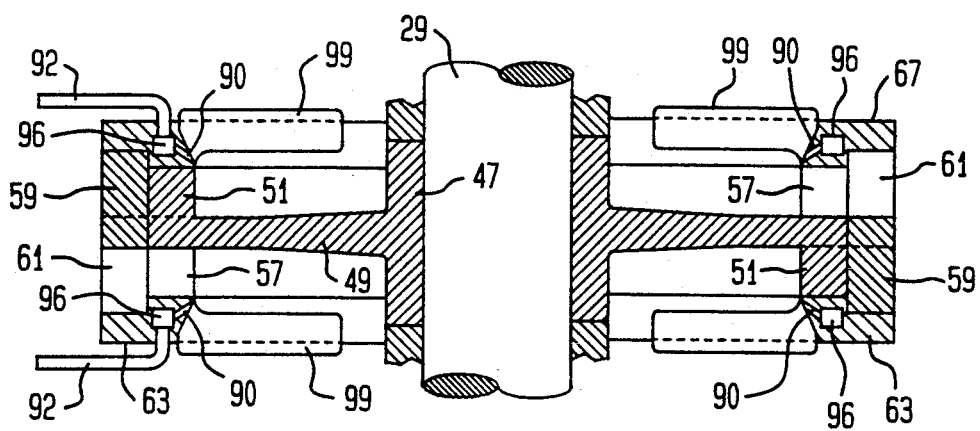
FIG. 7 is a fragmentary sectional view, similar to that of FIG. 3, showing an alternate rotor/stator assembly for use by a modified version of the apparatus illustrated in FIG. 1.

FIG. 7 illustrates two optional features that can be incorporated into the rotor-stator assembly 23 in order to achieve certain additional effects. As shown in FIG. 7, each of the shroud walls 63 and 67 is equipped with a number of flow straightener vanes 99 extending toward the axis of rotation of the rotor 37. More particularly, each of the straightener vanes 99 extends along a radial line passing through the axis of the shaft 29, whereby the sludge assumes a generally axial motion as it enters the rotor 37. The straightener vanes 99 function to remove a substantial portion of the rotational flow component generated by the propellers 35 and 41. The number, size, and configuration of the straightener vanes 99 may be varied. For example, eight vanes can be used.

The principal reason for using the vanes 99 is to increase the sludge flow rate. Any pronounced swirl in the flow pattern while the sludge is located near the web wall 49 will increase the residence time of the sludge in the rotor 37, resulting in a decreased sludge mass flow rate through the rotor 37. A high sludge circulation rate is desirable, because greater impact fragmentation forces are developed in the slots 61 of the stator 59, and also because the sludge then has a greater number of passes through the stator 59 for a given overall residence time in the tank 10.

As also shown in FIG. 7, an oxygen or air injection system includes an annular passage 96 located within each of the shroud walls 63 and 67. An oxygen or air supply pipe 92 extends between each of the shroud walls 63 and 67 and the side wall 11 of the tank 10. An external pump (not shown) can be mounted on the tank 10 to pump oxygen or air through each of the pipes 92 and into an associated annular passage 96. Jet-type orifices 90 extend from each of the passages 96 to the inner edges of the shroud walls 63 and 67, whereby oxygen or air can be discharged into the sludge as it flows into the rotor 37. The oxygen supply can be either pure oxygen, or oxygen contained in air.

The purpose for introducing oxygen or air into the sludge stream is to promote aeration of the sludge. Thus, while the sludge is residing within the tank 10, it can also be subjected to aeration for enhanced microbial activity of the sludge particulates. The oxygen or air is introduced to the sludge particles just prior to their fragmentation in the slots 61 of the stator 59. In theory, at the instant of sludge particle fragmentation, the newly exposed sheared surfaces of the particulates or particles will have the opportunity to come into direct contact with the oxygen molecules, thereby increasing the level of microbial activity. The oxygen will not have to encounter the resistance of a thick water film in order to reach the particle surface. Also, the oxygen molecules and the sludge particles will be in violent motion so that the oxygen has an increased probability for striking and penetrating the sludge fragments.

When the present invention is employed in conjunction with an anaerobic digestion process, treating either primary sludge or recycled anaerobic sludge, the tank 10 can be closed and thus function as an extension of the primary anaerobic digestion tank. A vent opening 86, as shown in FIG. 1, may be provided in the fixed cover 15 for the purpose of removing methane gas produced during the anaerobic digestion process. The anaerobic digestion process is aided by maintaining the tank sludge at a temperature of approximately 90° F. to 95° F. A jacket 84 is additionally provided on the exterior of the tank 10 to permit circulation of a heating or cooling liquid around the side wall 11 of the tank 10. It is further contemplated that the flow of liquid through the jacket 84 can be thermostatically controlled to achieve a desired sludge temperature within the tank 10.

Figure 8:
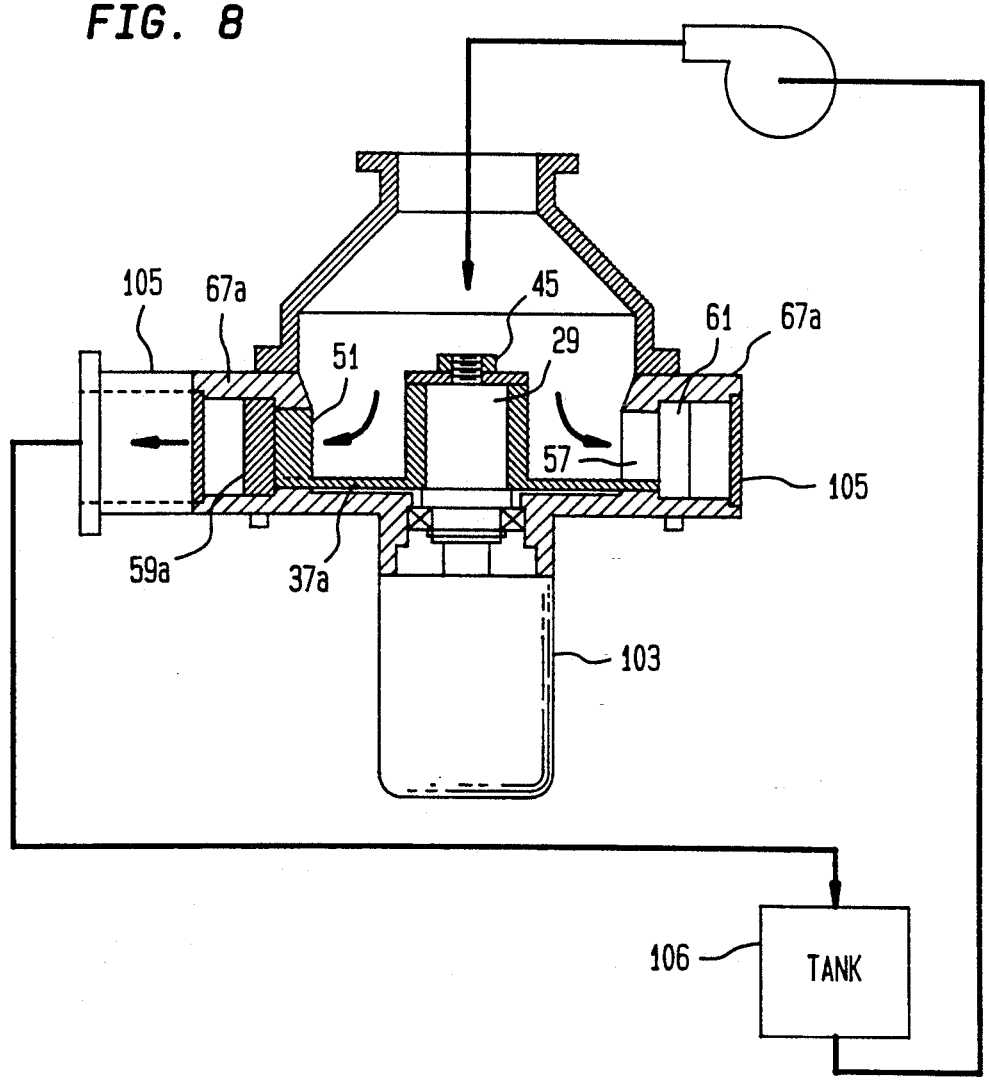
FIG. 8 is a partly sectional and partly schematic view, similar to that of FIG. 1, of yet another apparatus adapted to practice the present invention.

FIG. 8 illustrates another exemplary embodiment of a rotor-stator assembly usable in a liquid sludge line, rather than in a tank, to carry out a fragmentation operation in accordance with the present invention. In this embodiment, the sludge enters a rotor 37a through a central opening in a shroud wall 67a. Slots in the rotor 37a, and in a surrounding stator 59a, produce the desired sludge particle fragmentation action, as discussed extensively above. The rotor 37a can be directly driven or belt-driven. As shown, a shaft 29 is directly connected to an external drive motor 103. The stator 59a is located within a scroll-shaped housing.

The embodiment of FIG. 8 can be located in a pipeline which extends from a sludge source to a dewatering unit. Alternately, it could be arranged in a recirculation line associated with a sludge storage tank 106, in which case the sludge would be fragmented and then recirculated back to the storage tank 106. A separate pipeline would then connect the tank 106 to a dewatering apparatus (not shown).

Figure 9:
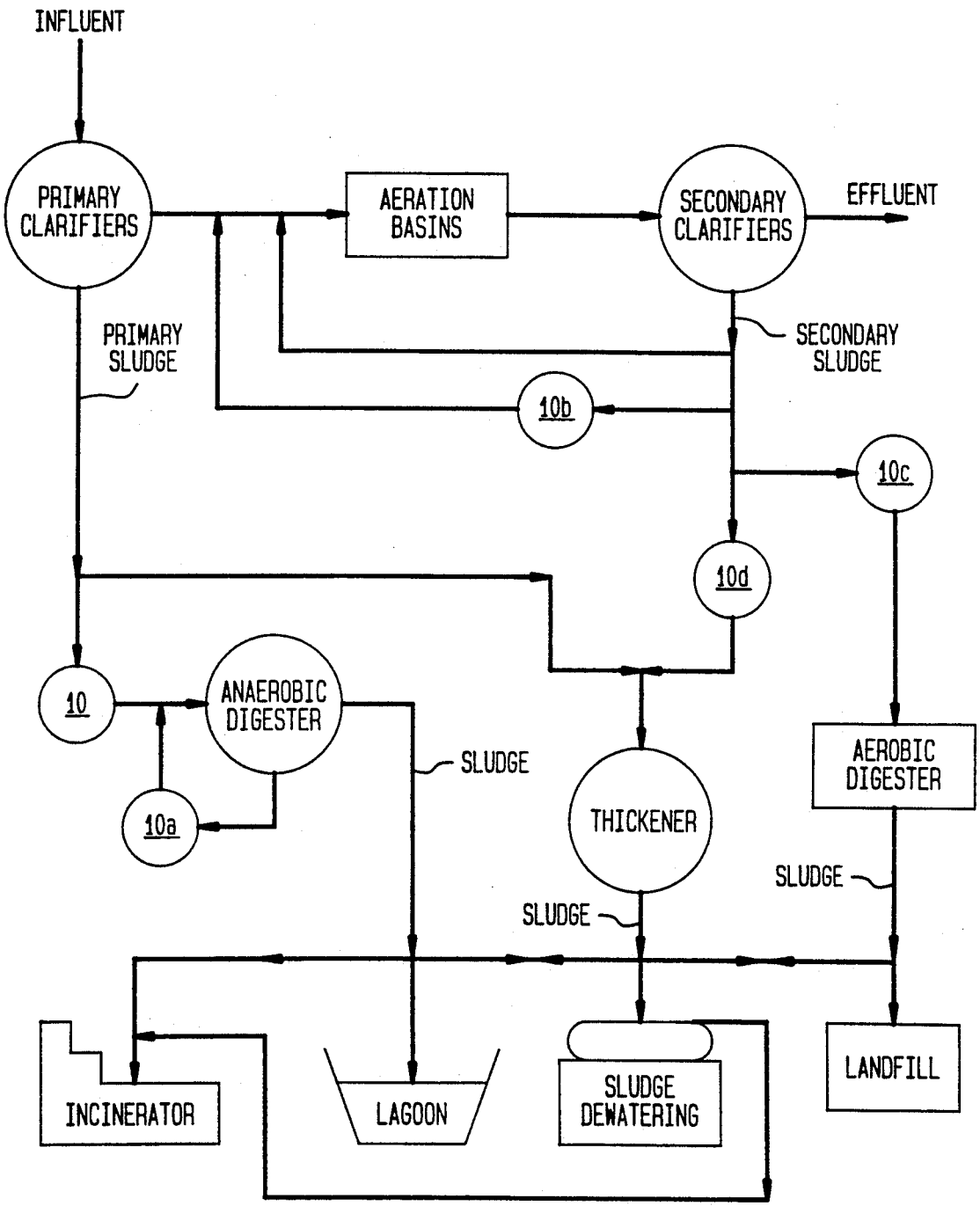
FIG. 9 is a flow diagram of a waste water processing system equipped to practice the present invention.

Both the exemplary embodiment of FIG. 1 and the exemplary embodiment of FIG. 8 are adapted for use at various different stages of an otherwise conventional waste water processing system. For example, as shown in FIG. 9, the tank 10 can be located between primary clarifiers and an anaerobic digester for the purpose of treating primary sludge produced in the primary clarifiers. A similar tank 10a could be located in a recirculation line of the anaerobic digester for the purpose of treating recycled anaerobic sludge. Another tank 10b could be located so as to receive and treat waste activated sludge travelling from secondary clarifiers to the aeration basins. Alternatively, the waste activated sludge could be treated in yet another tank 10c on its way to an aerobic digester, or it could be treated in still another tank 10d before being combined with the primary sludge and then transferred to a thickener and finally to a dewatering apparatus, a landfill, a lagoon or an incinerator.

As a result of the fragmentation processes carried out in the tanks 10, 10a, 10b and 10c, the destruction of microbial cells in the aeration basins and in the aerobic and anaerobic digesters is enhanced. More particularly, when the primary sludge, the waste activated sludge and the recycled anaerobic sludge are subjected to further treatment in the aeration basins or in the aerobic and anaerobic digesters, the sheared cells produced during the fragmentation processes carried out in the tanks 10, 10a, 10b and 10c are more easily digested, resulting in a smaller quantity of dry solids to be ultimately disposed of. The fragmentation process carried out in the tank 10d enhances the operation of the dewatering apparatus as explained in connection with the description of FIG. 6.

It should be understood that the embodiments described herein are merely exemplary and that a person skilled in the art may make many variations and modifications without departing from the spirit and scope of the invention. All such variations and modifications are intended to be included within the scope of the invention as defined in the appended claims.

We claim:

1. A method of treating liquid waste water sludge, comprising the steps of separating said sludge into a plurality of separate and independent stream by passing said sludge through a separation means; propelling each of said separate and independent streams of sludge through the separation means so as to create a corresponding plurality of propelled streams of sludge; and mechanically shearing solid particles contained in said propelled streams of sludge to such an extent that at least some of said solid particles are broken into smaller-sized fragments, whereby liquid contained in pores of said fragmented particles is released.

2. A method according to claim 1, wherein said fragmented particles are sheared to such an extent that microbial cells within said fragmented particles are ruptured, thereby exposing cell protoplasm.

3. A method according to claim 1, wherein said propelled streams of sludge impinge on a plurality of contact surfaces during the performance of said shearing step, whereby at least some of said solid particles impinge on said contact surfaces.

4. A method according to claim 3, wherein said propelled streams of sludge impinge repeatedly on said contact surfaces, thereby increasing the number of solid particles impinging thereon.

5. A method according to claim 4, wherein said propelled streams of sludge impinge enough times against said contact surfaces to subject at least some of the impinged particles to multiple impingements.

6. A method according to claim 5, wherein said propelled streams of sludge are propelled by a rotor mounted for rotation about an axis of rotation.

7. A method according to claim 6, wherein the separation means includes a rotor having a first series of slots, said plurality of separate and independent streams of sludge being formed by said first series of slots, each slot of said first series of slots being sized and shaped so as to discharge a corresponding one of said propelled streams of sludge in a generally radial direction relative to said axis of said rotor.

8. A method according to claim 7, wherein said contact surfaces are provided in an annular stator extending circumferentially about said rotor and including a second series of slots, each slot of said second series of slots intermittently communicating with each slot of said first series of slots as said rotor rotates relative to said stator.

9. A method according to claim 8, wherein at least some of said solid particles contained within each of said propelled streams of sludge impinge upon said stator.

10. A method according to claim 9, wherein at least some of said solid particles contained within each of said propelled streams of sludge impinge upon a wall of at least one slot of said second series of slots.

11. A method according to claim 8, wherein at least some of said solid particles contained within each of said propelled streams of sludge impinge repeatedly upon a wall of at least one slot of said second series of slots.

12. A method according to claim 8, wherein each slot of said first series of slots has a non-radial orientation relative to said axis of said rotor.

13. A method according to claim 12, wherein each slot of said second series of slots has a radial orientation relative to said axis of said rotor.

14. A method according to claim 12, wherein each slot of said second series of slots has a non-radial orientation relative to said axis of said rotor.

15. A method according to claim 14, wherein each slot of said second series of slots includes an inlet end having one non-radial orientation relative to said axis of said rotor and an outlet end having another non-radial orientation relative to said axis of said rotor.

16. A method according to claim 8, wherein each slot of said first series of slots has a first width and wherein each slot of said second series of slots has a second width which is substantially the same as said first width.

17. A method according to claim 8, wherein each slot of said first series of slots has a first width and wherein each slot of said second series of slots has a second width which is greater than said first width.

18. A method according to claim 8, wherein each slot of said first series of slots has a first width and wherein each slot of said second series of slots has a second width which is less than said first width.

19. A method according to claim 8, further comprising the step of supplying said sludge to said rotor.

20. A method according to claim 19, wherein said sludge is supplied to said rotor in a generally axial direction relative to said axis of said rotor.

21. A method according to claim 20, wherein said sludge is inhibited from swirling as it is supplied to said rotor.

22. A method according to claim 21, wherein said sludge is inhibited from swirling by a plurality of stationary vanes, each vane extending in a generally radial direction relative to said axis of said rotor.

23. A method according to claim 19, further comprising the step of aerating said sludge as it is supplied to said rotor.

24. A method according to claim 23, wherein said sludge is aerated with oxygen.

25. A method according to claim 23, wherein said sludge is aerated with air.

26. A method according to claim 8, further comprising the step of circulating said sludge from said stator back to said rotor.

27. A method according to claim 26, wherein said sludge is circulated in a toroidal flow path.

28. A method according to claim 8, wherein said shearing step is performed in a receptacle for said sludge.

29. A method according to claim 28, wherein said receptacle includes a storage tank.

30. A method according to claim 29, further comprising the steps of heating the sludge contained in said storage tank and removing gas produced by the sludge contained in said storage tank.

31. A method according to claim 28, wherein said receptacle includes a pipeline.

32. A method according to claim 1, further comprising the step of aerating said sludge during said shearing step.

33. A method according to claim 1, wherein said sludge is primary sludge.

34. A method according to claim 33, wherein said primary sludge is produced by a primary clarifier.

35. A method according to claim 33, wherein said primary sludge is transferred to an anaerobic digester after the performance of said shearing step.

36. A method according to claim 35, further comprising the step of dewatering the primary sludge after its discharge from said anaerobic digester.

37. A method according to claim 1, wherein said sludge is recycled anaerobic sludge.

38. A method according to claim 37, wherein said recycled anaerobic sludge is produced by an anaerobic digester.

39. A method according to claim 38, wherein said recycled anaerobic sludge is returned to said anaerobic digester after the performance of said shearing step.

40. A method according to claim 1, wherein said sludge is waste activated sludge.

41. A method according to claim 40, wherein said waste activated sludge is produced by a secondary clarifier.

42. A method according to claim 40, wherein said waste activated sludge is transferred to an aeration basin after the performance of said shearing step.

43. A method according to claim 40, further comprising the step of dewatering said waste activated sludge after the performance of said shearing step.

44. A method according to claim 40, wherein said waste activated sludge is transferred to an aerobic digester after the performance of said shearing step.

45. A method according to claim 1, further comprising the step of dewatering said sludge after the performance of said shearing step.

* * * * *